United States Patent
Ichien et al.

(10) Patent No.: US 6,373,892 B1
(45) Date of Patent: *Apr. 16, 2002

(54) METHOD FOR COMPRESSING AND DECOMPRESSING MOVING PICTURE INFORMATION AND VIDEO SIGNAL PROCESSING SYSTEM

(75) Inventors: Toru Ichien, Urawa; Junichi Kimura, Hachioji; Tadashi Saitoh, Koganei; Yutaka Okunoki, Kawaguchi, all of (JP)

(73) Assignee: Sega Enterprises, Ltd., Toyko (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/554,965

(22) Filed: Nov. 13, 1995

(30) Foreign Application Priority Data

Nov. 17, 1994 (JP) .............................................. 6-283840

(51) Int. Cl.$^7$ ............................................... H04N 11/02
(52) U.S. Cl. ................................................. 375/240.08
(58) Field of Search ................................. 348/390, 578, 348/585, 597, 580, 571, 575, 584, 586, 587, 396, 590; 345/113; 364/413.22; 382/260; 386/46; H04N 11/02

(56) References Cited

U.S. PATENT DOCUMENTS

| 4,689,681 A | * | 8/1987 | Jackson ....................... 348/590 |
|---|---|---|---|
| 4,689,682 A | * | 8/1987 | Jackson ....................... 348/578 |
| 4,700,232 A | * | 10/1987 | Abt et al. .................... 348/580 |
| 4,774,507 A | | 9/1988 | Kashigi et al. |
| 4,777,598 A | * | 10/1988 | Kellar et al. ............ 364/413.22 |
| 4,827,253 A | * | 5/1989 | Maltz .......................... 345/113 |
| 4,831,447 A | * | 5/1989 | Lake, Jr. ...................... 348/597 |
| 4,875,097 A | * | 10/1989 | Jackson ....................... 348/585 |
| 5,121,210 A | | 6/1992 | Hirayama |
| 5,561,723 A | * | 10/1996 | DesJardins et al. ......... 382/260 |
| 5,570,197 A | * | 10/1996 | Boon ........................... 386/46 |

FOREIGN PATENT DOCUMENTS

WO    WO91/07845    5/1991

* cited by examiner

*Primary Examiner*—Young Lee
(74) *Attorney, Agent, or Firm*—Mattingly, Stanger & Malur, P.C.

(57) ABSTRACT

A method for compressing and decompressing moving picture information wherein a key signal is correctly reproduced and coding is efficiently carried out, and a video signal processing system for implementing the method. At the time of coding a video signal, conversion is carried out for make large a distance between an ordinary digitized video signal and a key signal indicative of whether an image indicates background or foreground for data compression. At the time of decoding the coded video signal, the video signal and key signal of the decompressed image are separated based on a predetermined threshold and reverse conversion opposite to the coding mode is carried out. Since the coding is carried out with the ordinary video signal separated from the key signal, the video signal and the key signal can be separated by a suitable threshold from the compressed and then decompressed image and thus the video signal and key signal can be correctly reproduced.

10 Claims, 5 Drawing Sheets

METHOD FOR COMPRESSING AND DECOMPRESSING MOVING PICTURE INFORMATION AND VIDEO SIGNAL PROCESSING SYSTEM

BACKGROUND OF THE INVENTION

The present invention relates to image processing techniques and more particularly, to a technique which can be especially effectively applied to a method for compressing and decompressing moving pictures. More particularly, the present invention pertains to a compression/decompression method by which, when it is desired to combine a restored image with another image to form a combined image or video signal for example, a key signal necessary for it can be simultaneously suitably recorded or transmitted together with the combined video signal, and also pertains to a video signal processing system which can remove the key signal from the combined video signal including the key signal to output the combined video signal.

There has been conventionally well known such a method as a "chroma key" scheme, when it is desired to superimpose a moving picture on another image to form a combined image, for image-picking up of a target object with a solid-color or unfigured background behind it and generating a key signal indicative of the presence or absence of the background from the background color for the formation of the combined image.

In such a prior art image combining method as mentioned above, however, when a moving picture is subjected to a high-efficiency coding (i.e., data compression) and then to a decompressing operation, the compressed moving picture cannot always be restored to the original image and thus the key signal cannot sometimes be reproduced correctly. For this reason, a problem sometimes occurs that such a place (which will be referred to as the background, hereinafter) that is to be replaced by another image on the basis of the key signal cannot be correctly replaced thereby or conversely such a place (which will be referred to as the foreground, hereinafter) that is not to be replaced by another image can be wrongly replaced thereby.

SUMMARY OF THE INVENTION

It is an object of the present invention to provide a method for compressing and decompressing moving pictures on a high-efficient coding basis which can eliminate the above problem in the prior art and can reproduce a key signal correctly.

Another object of the present invention is to provide a video signal processing circuit which can reproduce a key signal highly accurately and can decompress a moving picture subjected to a high-efficiency coding to reproduce a high quality of original image.

In accordance with an aspect of the present invention, to achieve the above objects there are provided a method and system for compressing and decompressing a moving picture which includes a step or means for performing conversion to separate values of an original video signal from a value of a key signal indicative of background or non-background and a step or means for performing reverse conversion opposite to the coding mode, and wherein the separation between the video signal and key signal from the compressed and decompressed image is carried out with use of a threshold for discrimination.

In another aspect of the invention, it is desirable that key signals of both pixels adjacent to a target pixel of reproduction video information are referred to and when either one of the key signals indicates background, the key signal of the current pixel is changed to have a value indicative of background.

With the above arrangement, when the range of the key signal and the video signal be uniquely specified to make large the distance in signal level between the ordinary video signal and the key signal and to perform coding thereover, the separation between the video and key signals from the compressed and decompressed image can be facilitated and thus the video and key signals can be correctly reproduced. Further, since the discrimination between both signals is carried out with use of the threshold, the correct separation between the video and key signals can be carried out while avoiding an error in the decompressed video signal. Furthermore, since the threshold is prepared to have a plurality of values, a more accurate separation between the video and key signals can be realized. In addition, since key signals of both pixels adjacent to a target pixel of the reproduction video information are referred to and when either one of the key signals indicates background, the key signal of the current pixel is changed to have a value indicative of background, and the reproduction of the key signal can be realized at the border between the background and the foreground.

BRIEF DESCRIPTION OF THE DRAWINGS

Other objects, features and advantages of the invention will become apparent from the detailed description of the embodiments taken in conjunction with the accompanying drawings, in which.

DESCRIPTION OF THE PREFERRED EMBODIMENTS

An embodiment of the present invention will be explained with reference to the accompanying drawings.

For simplicity of description, explanation will be made as to an embodiment in which each of the pixels of a video image is made up of 8 bits. Even when the amount of information on one pixel is other than 8 bits, the present invention can be embodied in a similar manner.

Figure 1:
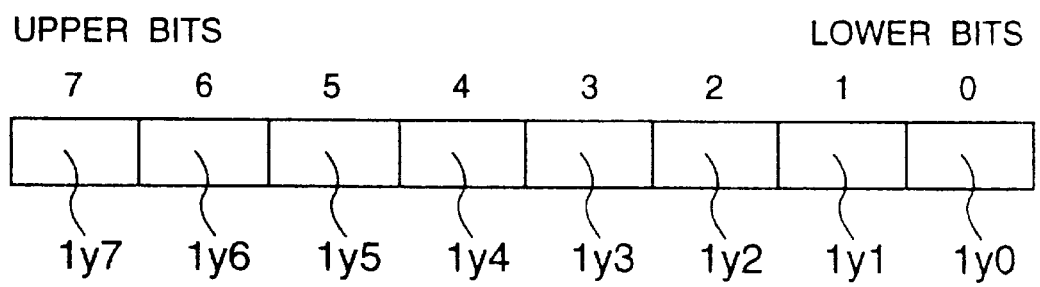
FIG. 1 is a bit format of a video signal in a prior art showing how to assign bits of the video signal not including an ordinary key signal.

FIG. 1 shows how to assign the bits of a prior art video signal not containing a key signal. This video signal, as illustrated, has an information amount of 8 bits, i.e., its most significant bit (MSB) ly7, bits ly6, ly5, ly4, ly3, ly2, ly1, and its least significant bit (LSB) ly0. In the prior art, however, when it is desired to record or transmit the video signal, no consideration is paid to such an application as to combine the video signal with another video signal. In other words, a method for recording or transmitting a key signal for use in the image composition or combination is not prepared.

The present embodiment is intended not to add any modification to the prior art recording/transmitting method and to record and transmit a key signal while maintaining compatibility with the prior art. To this end, the present embodiment has a bit array such that the information on the format of each of the pixels of the video signal is partly deleted and instead a key signal is assigned thereto. Although the key signal can be made up of a plurality of bits, it may be made up of only one bit since the key signal is sufficient only to have information (such as a flag) indicative of replacement or non-replacement of an image with another image at the time of image composition. In the present embodiment, the least significant lowest bit ly0 was deleted in the video signal. In this connection, however, it will be readily appreciated that the amount of information of the video signal is not limited to 8 bits but may be any number of bits.

Figure 2:
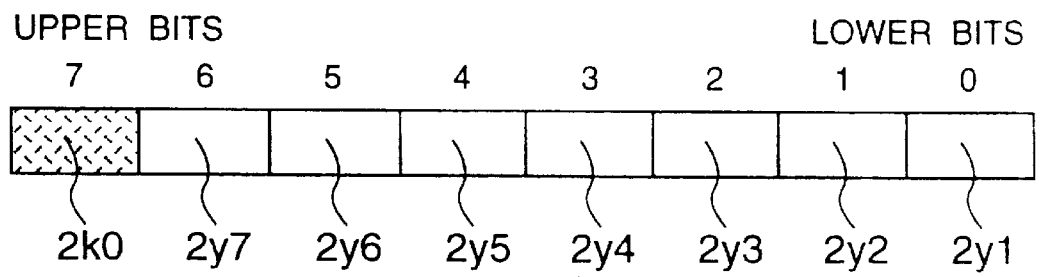
FIG. 2 is a bit format of a video signal in accordance with the present invention showing how to assign bits of the video signal including a key signal, with part of the video information removed.

Shown in FIG. 2 is how to assign the bits of a video signal including a key signal when the afore-mentioned method is applied. Since the amount of image data becomes usually enormous, the image data is in many cases subjected to a data compression when it is desired to record or transmit the image. When the image is subjected to data compression and then to data decompression, however, the compressed image cannot always be restored to its original image. In the case of an ordinary video signal, when several of the lower bits of the video signal vary, this will substantially not influence the reproduction of the video signal. However, a change in the key signal may possibly result in erroneous reproduction of the foreground and background. To avoid such a situation, in the present embodiment, the key signal is assigned to the most significant bit (MSB) position 2k0 which is the bit least influenced when the data is subjected to the data compression and decompression.

Further, when the key signal has a value indicating that the video pixel in question refers to a background, the pixel is replaced by a foreground video image in its image combination mode and thus video information on the pixel becomes unnecessary.

In this case, it is previously determined to record zeros (o's) (value) in bits 2y7 to 2y1 of the video signal, so that a level distance between the video signal and key signal can be made large. As a result, even when the data compression/decompression of the video signal results in the fact that an error occurs for the original image due to the discrete cosine transform (DCT) processing in the data compression/decompression, the key signal can be correctly reproduced.

With the above bit assigning method in mind, an explanation will be made of a coding procedure when a video signal including a key signal is recorded or transmitted, referring to FIG. 3. In this connection, it is assumed that the key signal indicative of a background has a logical value of "0" (bit 2k0=0) and the key signal indicative of a foreground has a logical value of "1" (bit 2k0=1). Such an assumption will not restrict the versatility of the present invention, because the reversal of this assignment enables implementation of the present invention in a similar way to the above. Accordingly, in the present embodiment it is assumed that the key signal means that which is mentioned above.

Figure 3:
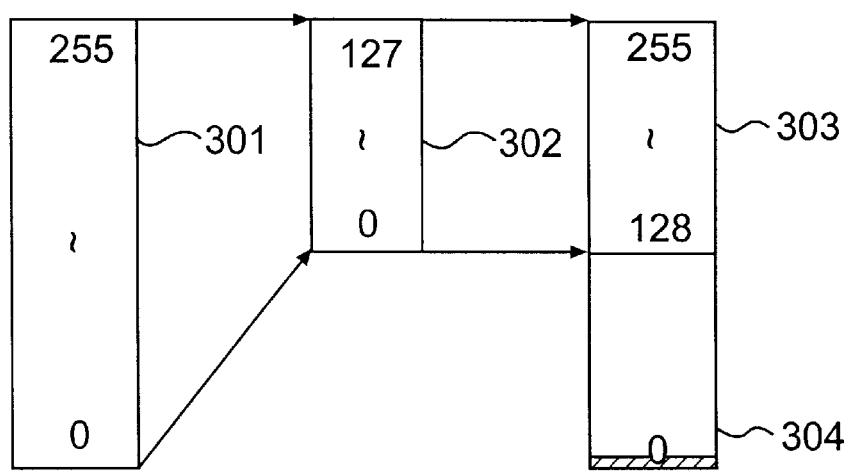
FIG. 3 is a diagram for explaining a coding procedure when a video signal having a key signal included therein is recorded and transmitted.

As shown in FIG. 3, when video information 301 corresponding to one of the pixels of an image is assumed to have an information amount of 8 bits, the video information 301 can take values of 0–255 and the video information 302 corresponding to the video information 301 but deleted by one bit can take values of 0–127. When the above pixel corresponds to part of a foreground of the image, the key signal has a value of "1". Therefore, "1" is set at the highest bit position and the values of the bits of the video signal are added by an offset value of 128 according to the assignment of the bits of the video signal including the afore-mentioned key signal to be converted to information 303 having a range of values of 128–255. When the pixel corresponds to part of a background of the image, the key signal has a value of "0" and its video information which becomes unnecessary at the time of image combination is also previously set at a value of 0, which results in that a video signal 304 corresponding to the background has a value of 0 and thus such information which takes values of 1–127 becomes absent at the time of coding.

Figure 4:
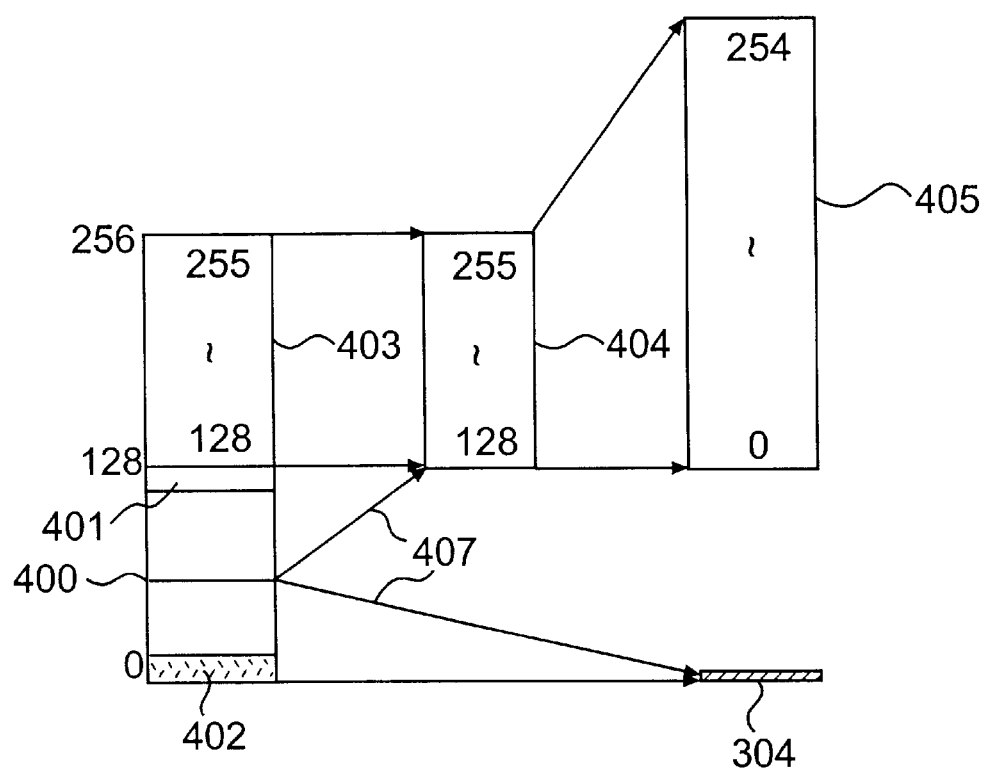
FIG. 4 is a diagram for explaining a decoding procedure when the key signal and the video information are separated from a video signal subjected to data compression/decompression.

When the above video signal is subjected to data compression and decompression, this causes an error between the original and reproduced images, whereby there may appear at the time of the decoding a video signal having values of 1–127 which has not been present at the time of the coding. To avoid such a video signal error, the key signal and video information are separated from the video signal having the error caused based on the original video signal. The decoding procedure for the separation will be explained with reference to FIG. 4.

As mentioned above, there is theoretically no occurrence that the video signal has values of 1–127 at the coding stage. However, when the image data is subjected to compression, recorded or transmitted and then subjected to decompression, an error takes place between the original and reproduced images, which results in that there occurs such a situation that the information having taken values of 128–255 as its initial foreground video information 403 takes values of 127 or less (information 401) or the information having taken a value of zero as the background key signal takes values of 1 or more (information 402).

When a threshold 400 for separation between the background key signal and foreground video information is previously set prior to the decoding, a key signal 406 indicative of the background can be separated from video information 404 containing the foreground key signal by clipping the background key signal and the foreground video information with use of the threshold 400. When the key signal indicates the foreground, the key signal (bit 2k0) having a value of "1" and indicative of the foreground is deleted, the video signal is expanded or decompressed by a factor of 2, and then restored to the original video information (information 405). When the threshold for separation between the key signal and the video signal is set to selectively have a value of, e.g., 64, 96 or 128 (see FIG. 5), even the video signal already subjected to the coding can be adjusted at the time of the decoding.

Figure 5:
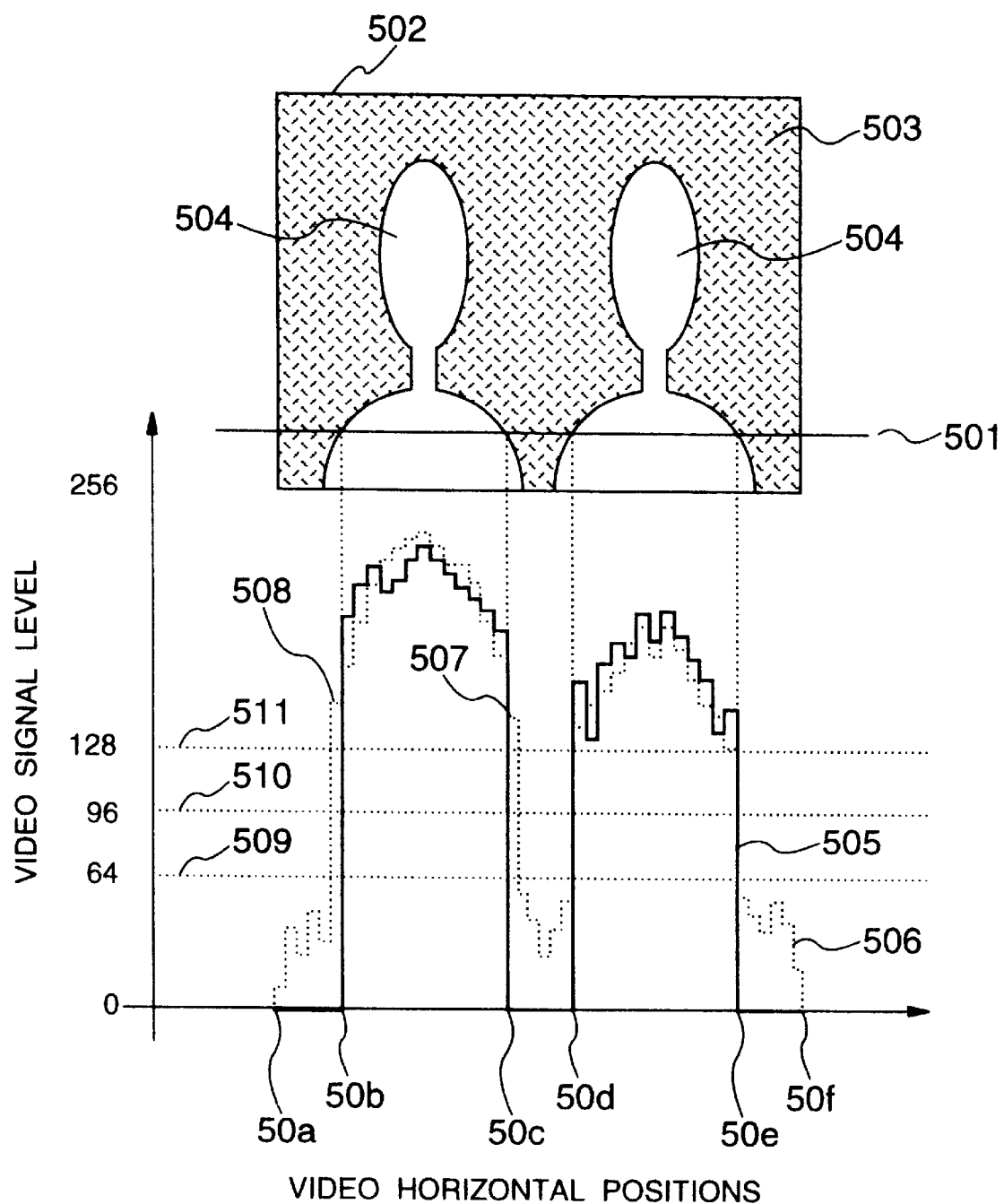
FIG. 5 is a diagram for explaining a spatial phenomenon which can possibly occur when a key signal and video information are separated from a video signal subjected to data compression/decompression.

FIG. 5 is a diagram for explaining a variation in a video signal when image data is compressed and decompressed in such a manner as mentioned above as well as a spatial phenomenon which possibly takes place during the compression and decompression. Also shown in FIG. 5 are an image 502 having a foreground 504 and also having a key signal indicative of replacement of a background 503 to be replaced by another image at the time of image combination, as well as a video signal level (more particularly, luminance signal level) corresponding to any one line 501 in the image.

In FIG. 5, when attention is turned to a video signal 505 of an original image prior to a data compression, the video signal 505 corresponding to zones of 50b–50c and 50d–50e corresponds to part of the foreground, the video signal 505 has values higher than a thershold 128, while the video signal 505 corresponding to zones of 50a–50b, 50c–50d and 50e–50f other than the above zones 50b–50c and 50d–50e has a value of 0. A video signal 506 subjected to a data compression/decompression has an error with respect to the video signal 505 of the original image. In order to avoid an information error caused by the error between the original and compressed/decompressed video signals, suitable thresholds 509–511 are set to separate the key signal from the video signal. However, in the border between the foreground and background, even when these thresholds are critically set, there may occur levels 507 and 508 such that the key signal cannot be correctly separated from the video signal.

In such a case, means for adjusting the key signal is provided so as to allow selection of expansion or non-expansion of the background key signal in the decoding mode.

The word "expansion" of the background key signal means that image data is subjected to a line or raster scan while key signals of pixels adjacent thereto are referred to, so that, if either one or both of the adjacent key signals indicate the background, then the key signal of the current pixel is also regarded to have a value indicative of the background. This enables the key signal erroneously reproduced at the border between the background and foreground to be appropriately adjusted.

Figure 6:
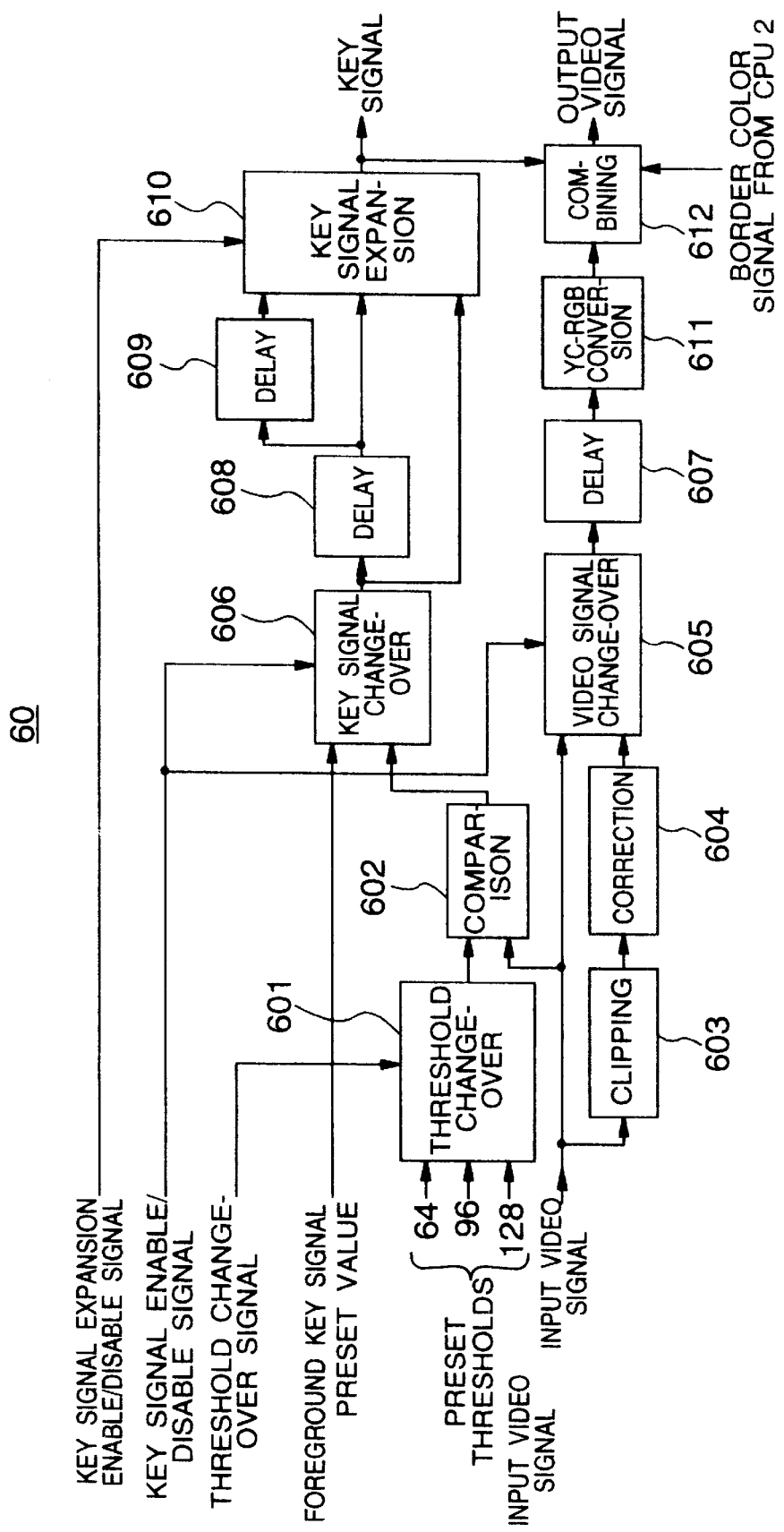
FIG. 6 is a block diagram of a video signal processing (reproducing) circuit in accordance with an embodiment of the present invention.

Turning now to FIG. 6, there is shown an example of an image reproducing circuit as an embodiment of the method of the present invention. In FIG. 6, a key-signal enable/disable signal indicates whether an input video signal contains a key signal or is an ordinary video signal not containing the key signal, and is discriminated from the input video signal by a CPU 2, explained later. A key-signal expansion enable/disable signal specifies the presence or absence of key signal expansion. A threshold change-over signal is used to change a threshold for use in separation between the key signal and video information. These signals should be known by a person who operates chroma-key control. Accordingly, it is necessary that these signals are input to the video signal reproducing circuit 60 from the CPU 2 (refer to FIG. 7) of a video signal processing circuit, separately from the input video signal and the threshold.

The operation of the video signal reproducing circuit 60 will be explained in conjunction with a flow of data. When the key signal enable/disable signal received from the CPU 2 is a disable indication, i.e., that the input video signal contains no key signal, the input video signal is selected at a video signal change-over circuit 605, delayed at a delay circuit 607, and then supplied as it is to a YC-RGB conversion circuit 611 and a combining circuit 612. At this time, the foreground key signal is selected in a key-signal change-over circuit 606 due to the key-signal enable/disable signal indicative of the disable and delayed at a delay circuit 608, and then applied to a key-signal expansion circuit 610 of the next stage. Since the key signal is also delayed at a delay circuit 609 and then applied to the key-signal expansion circuit 610, three inputs to the key-signal expansion circuit 610 all indicate the foreground key signals and the key-signal expansion enable/disable signal becomes invalid, whereby the foreground key signal is supplied from the key-signal expansion circuit 610 to the combining circuit 612 as it is.

When the key-signal enable/disable signal indicates the enable, i.e., that the input video signal contains the key signal, 8 bits of the input video signal are separately divided into the key signal and the video signal in accordance with the aforementioned decoding procedure using the threshold. More in detail, the video signal is first subjected at a clipping circuit 603 to a clipping operation at values of 128–256. At this time, if the input video signal has values of 1–127, then the clipping circuit 603 regards the input video signal to have a value of 128. The video signal subjected to the clipping operation is corrected by a correction circuit 604 so that values of 128–256 correspond to 0–254. This correction is carried out by an arithmetic operation such that "128" is subtracted from the values clipped by the clipping circuit 603 and then multiplied by 2.

Subsequently, the video information subjected to the correction is selected at the video signal change-over circuit 605, delayed at the delay circuit 607 and supplied to the YC-RGB conversion circuit 611 where conversion from Y (luminance) and C (chrominance) signals to RGB (red, green and blue) signals is carried out. And in the combining circuit 612, the video information is combined with a border color signal of, e.g., blue set by the CPU on the basis of the key signal received from the key-signal expansion circuit 610 to generate an output video signal which in turn is output from the combining circuit 612 to such a monitor display unit as a CRT.

When the key-signal enable/disable signal is enable, extraction of the key signal from the input video signal is simultaneously carried out. That is, the input video signal is compared with the threshold at a comparison circuit 602. Used as the threshold is the value of, e.g., 64, 96 or 128 selected by a threshold change-over signal previously specified in a threshold change-over circuit 601. As a result of the comparison between the input video signal and the threshold, when determining that the input video signal is larger than the threshold, the comparison circuit 602 outputs the foreground key signal; whereas, when determining that the input video signal is smaller than the threshold, the comparison circuit 602 outputs the background key signal. The key signal is selected at the key-signal change-over circuit 606 and applied directly to the key-signal expansion circuit 610, or delayed at the delay circuit 608 or at the delay circuits 608 and 609 and then applied to the key-signal expansion circuit 610.

In this case, the output of the delay circuit 608 is the key signal of the current pixel. When the input video signal is received with line scan or raster scan, the output of the key-signal change-over circuit 606 and the output of the delay circuit 609 are the key signals of pixels at its left-hand and right-hand adjacent to the pixel of the key signal corresponding to the output of the delay circuit 608. The key-signal expansion circuit 610 refers to the key signals of the left/right adjacent pixels and the key signal of the current pixel, outputs the foreground key signal only when all of these key signals indicate the foreground and otherwise outputs the background key signal, thus realizing the expansion of the background key signal.

Figure 7:
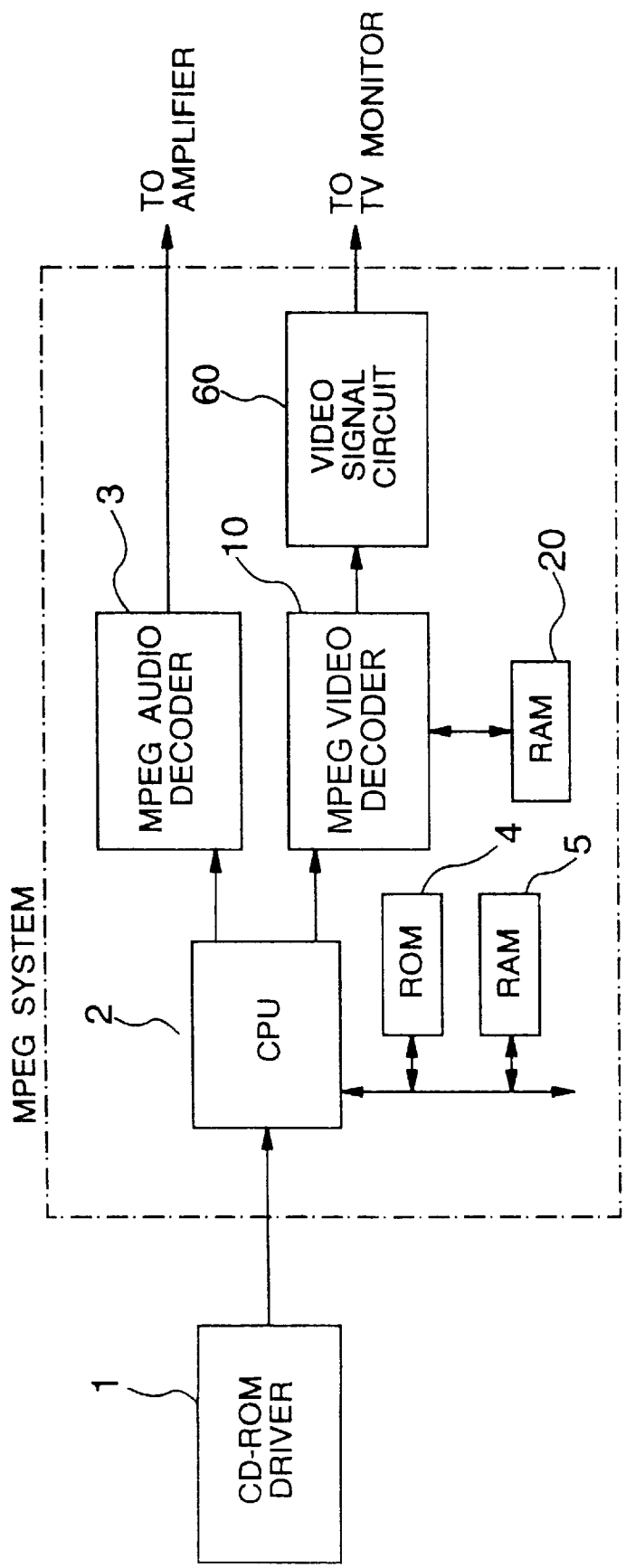
FIG. 7 is a block diagram of an embodiment of the present invention in which the circuit of the invention is applied to a moving picture reproducing system using an MPEG video decoder for decoding a moving picture.

Shown in FIG. 7 is a block diagram of an embodiment of the present invention when the reproduction circuit of FIG. 6 is applied to such a moving picture reproduction system that uses an MPEG video decoder (moving picture decoder) 10 based on video specifications called MPEG (moving picture experts group). Prior to explanation of the moving picture reproduction system of the present embodiment, explanation will be made of an example of a recording system for a CD-ROM in which moving picture data are recorded. A digital video signal to be recorded, which contains a luminance signal Y, chrominance signals Cb and Cr, is input to a preprocessing circuit. The component Y, which is made up of, e.g., 8 bits, is shifted toward the LSB side sequentially by one bit and "1" is set at the MSB using a shift register. Through this shifting operation, the LSB of the Y component is discarded. The chrominance signal Cr is output as it is and also applied to a coincidence circuit. The coincidence circuit for detecting a coincidence with a preset background color such as blue or black judges the presence or absence of the background and generates the aforementioned key signal. The key signal from the coincidence circuit is applied as a selection instruction signal to a selector circuit which selectively receives an output from the shift circuit and a preset value corresponding to the Y component signal regarded as an all 0 signal. When the key signal has a value of "0" indicative of the background, the selector circuit selects the Y component having a value of 0; while, when the key signal has a value of "1" indicative of the foreground, the selector circuit selects and outputs the Y component output shifted by the shift circuit and having a value of "1" at the MSB. The 3 components issued from the preprocessing circuit are applied to an encoder to be subjected therein to an encoding operation including a known MPEG encoding for data compression, and then recorded in such a recording medium as a CD-ROM as a video signal. At the time of the data compression, a signal level difference between the background and foreground is decompressed in accordance with the principle of FIG. 3.

Turning again to FIG. 7, the moving picture reproduction system of the present embodiment, as shown, includes a CD-ROM driver 1 for reading out moving picture data stored as compressed/coded in a CD-ROM, a microcomputer (CPU) 2 for separatedly dividing the read-out data into image data and voice data and also for decoding control information, an MPEG audio decoder 3 for decoding the separated moving picture data, an MPEG video decoder 10 for decoding the separated moving picture data, and a video signal reproducing circuit 60 having such a structure as shown in FIG. 6. A moving picture signal decoded by the MPEG video decoder 10 is sent through the video signal reproducing circuit 60 to such a monitor as a CRT display unit, while the decoded audio signal is sent to an audio amplifier. In this case, the background image signal may be provided, e.g., from the CPU 2.

Also included in the moving picture reproduction system are a read only memory 4 for storing therein a program to be executed by the CPU 2 and fixed data, a randomly readable/writable memory 5 used as a work area of the CPU 2, and a buffer memory (frame memory) 20 connected to the MPEG video decoder 10 for temporarily holding the decoded image data therein. The MPEG video decoder 10 and the video signal reproducing circuit 60 are made in the form of a single chip LSI. The LSI chip has been marketed under the name of MPEG 1 Decoder LSI HD814101F later than the date of the convention priority date claimed for the present application. However, the chip is not intended to be disclosed herein as the prior art.

Although the present invention made by the present inventor has been explained in detail in connection with the embodiments, it will be appreciated that the invention is not restricted to the specific embodiments but may be modified in various ways without departing from the spirit and scope of the invention as defined in the appended claims, as a matter of course.

For example, the foregoing embodiments have been explained in the connection with the case where the input video signal is of a digital type, the present invention may be applied even to the case where the input video signal is of an analog type.

As has been explained in the foregoing, in accordance with the present invention, the need for modifying the prior art system for recording or transmitting known data compressed/decompressed data can be eliminated, the key signal for use in the video signal combining or composition can be recorded or transmitted as part of the video signal, and the key signal can be correctly restored or reproduced without being influenced by an error generated during the data compression/decompression.

What is claimed is:

1. A method for reproducing moving picture information from a compressed video signal, said compressed video signal including coded original video signal information including moving picture information to be digitized and added with a key signal indicative of background or foreground so as to cause values of signal levels indicative of the original video signal to be offset from a value of a signal level of the key signal indicative of background, said method comprising the steps of:

decoding the compressed video signal;

separating the key signal from the video signal in a comparison circuit, wherein said decoded video signal is compared with a preset threshold to judge whether or not the decoded video signal includes said key signal indicative of background and outputting the key signal indicative of contents corresponding to the judgement result; and performing a reverse transformation using a clipping circuit receiving as an input the decoded video signal, to extract a video signal other than the key signal, and using a correction circuit to correct the extracted video signal to cause offset level distances between the values of the original video signal and the value of the key signal to be restored to respective original values.

2. A method as set forth in claim 1, wherein the signal level of said preset threshold is selected so as to separate the video signal from the key signal indicative of background to retrieve a video signal and a reproduction key signal from said decoded video signal on the basis of said preset threshold.

3. A method as set forth in claim 2, wherein said preset threshold is prepared to have a plurality of values, and any of the values of said preset threshold is selected to adjust reproduction of the decoded video signal and key signal to match a separation degree between a foreground and a background at the time of coding an original video signal to produce said compressed video signal.

4. A method as set forth in claim 1, wherein key signals of both pixels adjacent to a target pixel of reproduction video information of line scan or raster scan are referred to, and, when either one of said key signals indicates background, the key signal of a current pixel is made to have a value indicative of background.

5. A method as set forth in claim 1, further comprising the step of converting the video signal corrected by said correction circuit to a video signal suitable for a display unit.

6. A method as set forth in claim 1, wherein said preset threshold is selectively set, and wherein reproduction key signals, with respect to each pixel of said decoded video signal of a line scan display, are made to have values indicative of the background when either one of the reproduction key signals of the pixels adjacent to a target pixel is indicative of the background.

7. A video signal reproducing system for use in reproducing moving picture information from a compressed video signal, said compressed video signal including coded original video signal information including moving picture information to be digitized and added with a key signal indicative of background or foreground so as to cause values of signal levels indicative of the original video signal to be offset from a value of a signal level of the key signal indicative of background, said video signal reproducing system comprising:

a decoder which decodes the compressed video signal;

a clipping circuit functionally connected to said decoder and receiving as an input signal the decoded video signal, said clipping circuit extracting a video signal other than said key signal indicative of background or foreground;

a correction circuit connected with an output of said clipping circuit to correct the video signal to cause the offset level distances between the values of the original video signal and the value of the key signal to be restored to respective original values;

a comparison circuit functionally connected to said decoder and receiving the decoded video signal, said comparison circuit comparing said decoded video signal with a preset threshold to judge whether or not the decoded video signal includes the key signal indicative of background and outputting the key signal indicative of contents corresponding to the judgement result; and a synthesizer circuit functionally connected with outputs of said correction and comparison circuits, said synthesizer circuit outputting a video signal indicative of background when the key signal indicates the background on the basis of the key signal issued from said comparison circuit and outputting a video signal from said correction circuit when the key signal is indicative of foreground.

8. A video signal reproducing system as set forth in claim 7, wherein said decoder includes a decompression circuit decompressing the compressed video signal.

9. A video signal reproducing system for use in reproducing a digital video signal of a line scan type including moving picture information, comprising:

a clipping circuit receiving an input digital video signal subjected to data formatting and having a key signal indicative of background or foreground assigned to a most significant bit and having a least significant bit removed, the clipping circuit extracting a video signal of each pixel other than said key signal and outputting the extracted video signal;

a correction circuit connected with an output of said clipping circuit to correct the extracted video signal in a range of values taken by an original video signal;

a comparison circuit functionally connected to receive the input digital video signal, said comparison circuit comparing said input digital video signal with a preset threshold to judge whether or not the input digital video signal includes the key signal indicative of background and outputting the key signal indicative of contents corresponding to the judgement result; and a synthesizer circuit functionally connected with outputs of said correction and comparison circuits, said synthesizer circuit outputting a video signal indicative of background when the key signal indicates background on the basis of the key signal issued from said comparison circuit, and outputting a video signal from said correction circuit when the key signal is indicative of foreground.

10. A method for decoding a digital video signal of a line scan type including moving picture information, comprising the steps of:

using a clipping circuit, extracting, from an input digital video signal subjected to a data formatting and having a key signal indicative of background or foreground assigned to a most significant bit and a least significant bit removed, the video signal of each pixel other than said key signal;

in a correction circuit, correcting said extracted video signal to have values in a range of values taken by an original video signal;

in a comparison circuit, comparing a preset threshold with said input digital video signal to judge whether or not said input digital video signal includes the key signal indicative of background and to generate the key signal corresponding to the judged contents; and in a synthesizer circuit, outputting a video signal indicative of the background when the key signal indicates the background on the basis of the generated key signal and outputting said corrected video signal when the key signal indicates foreground.

* * * * *